US012641619B2

(12) United States Patent
Wang

(10) Patent No.: US 12,641,619 B2
(45) Date of Patent: May 26, 2026

(54) SCHEDULING MODE DETERMINATION METHOD, TERMINAL AND NETWORK SIDE DEVICE

(71) Applicant: DATANG MOBILE COMMUNICATIONS EQUIPMENT CO., LTD., Beijing (CN)

(72) Inventor: Lei Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 525 days.

(21) Appl. No.: 17/918,106

(22) PCT Filed: Apr. 13, 2021

(86) PCT No.: PCT/CN2021/086888
§ 371 (c)(1),
(2) Date: Oct. 10, 2022

(87) PCT Pub. No.: WO2021/208904
PCT Pub. Date: Oct. 21, 2021

(65) Prior Publication Data
US 2023/0134938 A1 May 4, 2023

(30) Foreign Application Priority Data
Apr. 15, 2020 (CN) .......................... 202010294638.6

(51) Int. Cl.
*H04W 72/232* (2023.01)
(52) U.S. Cl.
CPC ................................ *H04W 72/232* (2023.01)
(58) Field of Classification Search
CPC ... H04W 72/232; H04W 72/12; H04W 72/23; H04L 5/001; H04L 5/0053; H04L 5/0091
See application file for complete search history.

(56) References Cited

U.S. PATENT DOCUMENTS 11,665,699 B2 * 5/2023 Takeda .............. H04W 72/1273
370/329
2012/0009923 A1 1/2012 Chen
(Continued)

FOREIGN PATENT DOCUMENTS

CN 102625456 A * 8/2012
CN 102811495 A 12/2012
(Continued)

OTHER PUBLICATIONS

International Search Report for PCT/CN2021/086888 issued on Jun. 29, 2021 and its English Translation provided by WIPO.
(Continued)

*Primary Examiner* — Derrick W Ferris
(74) *Attorney, Agent, or Firm* — Harness, Dickey & Pierce, P.L.C.

(57) ABSTRACT

The present disclosure provides a scheduling mode determination method, a terminal and a network side device. The scheduling mode determination method includes: receiving, by a terminal, DCI from a network side device; and determining, by the terminal, that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

16 Claims, 3 Drawing Sheets receiving, by a terminal, DCI from a network side device ⟩ 201 determining, by the terminal, that the DCI corresponds to a first scheduling mode or a second scheduling mode ⟩ 202

(56) References Cited

U.S. PATENT DOCUMENTS

| | | | |
|---|---|---|---|
| 2014/0086184 A1 | 3/2014 | Guan et al. | |
| 2016/0285609 A1 | 9/2016 | Han et al. | |
| 2019/0053318 A1 | 2/2019 | Nogami et al. | |
| 2019/0182812 A1 | 6/2019 | Shimezawa et al. | |
| 2019/0387501 A1 | 12/2019 | Park et al. | |
| 2020/0022144 A1 | 1/2020 | Papasakellariou | |
| 2020/0162226 A1* | 5/2020 | Tang | H04L 5/0094 |
| 2021/0119686 A1 | 4/2021 | Tang | |
| 2021/0235453 A1 | 7/2021 | Matsumura et al. | |
| 2022/0053523 A1* | 2/2022 | Jia | H04W 72/0453 |
| 2022/0225373 A1* | 7/2022 | Li | H04W 72/20 |
| 2023/0020414 A1* | 1/2023 | Harada | H04W 72/23 |

FOREIGN PATENT DOCUMENTS

| | | | |
|---|---|---|---|
| CN | 110073606 A | 7/2019 | |
| CN | 110475356 A | 11/2019 | |
| CN | 111010889 A | 4/2020 | |
| WO | 2018107363 A1 | 6/2018 | |
| WO | 2019215888 A1 | 11/2019 | |
| WO | 2020013028 A1 | 1/2020 | |

OTHER PUBLICATIONS

Written Opinion for PCT/CN2021/086888 issued on Jun. 29, 2021 and its English Translation provided by WIPO.

International Report on Patentibily for PCT/CN2021/086888 issued on Oct. 13, 2022 and its English translation provided by WIPO.

First Taiwanese Office Action for Taiwanese Patent Application No. 110113150, issued on Dec. 7, 2021 by the Taiwanese Patent Office and its English Translation provided by the foreign associate.

"FL summary on "Others" under Multi-RAT Dual-Connectivity and Carrier Aggregation enhancements," 3GPP TSG RAN WG1 Meeting #98bis, R1-1911493, Chongqing, P.R. China, Oct. 14-20, 2019, Agenda item: 7.2.13.6, Source: Nokia, Nokia Shanghai Bell, all pages.

The Extended European Search Report for the corresponding European Patent Application No. 21788206.7 issued by the European Patent Office on Sep. 8, 2023.

First Chinese Office Action and search report for the corresponding Chinese Patent Application No. 202010294638.6 issued by the Chinese Patent Office on May 17, 2023 and its English Translation provided by foreign associate.

* cited by examiner

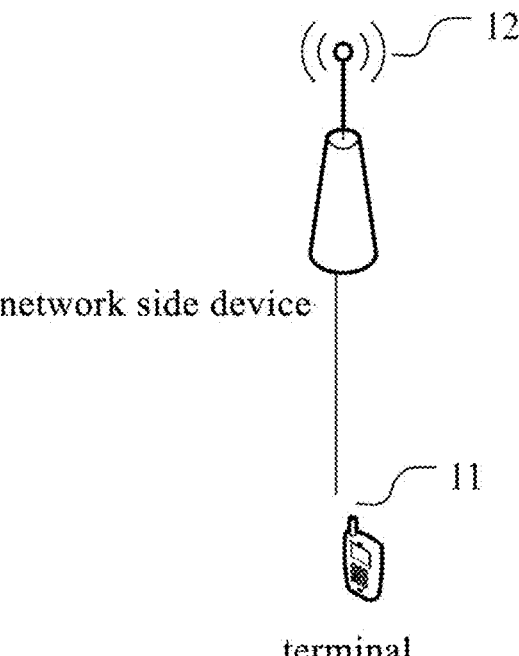
network side device
terminal
FIG. 1
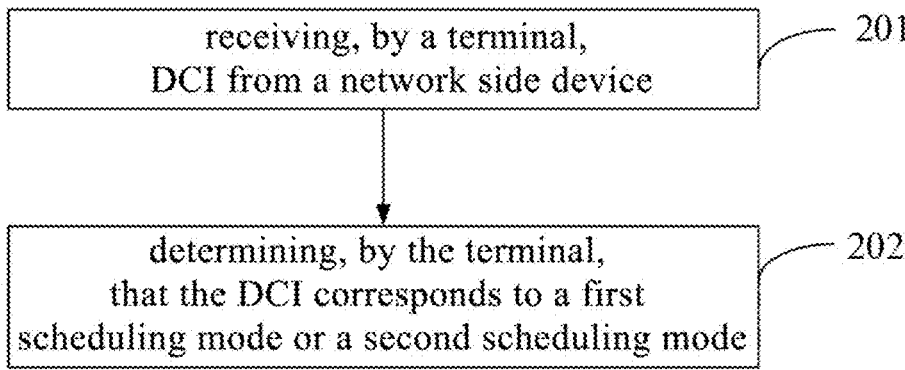
receiving, by a terminal,
DCI from a network side device    201
determining, by the terminal,
that the DCI corresponds to a first
scheduling mode or a second scheduling mode    202
FIG. 2
transmitting,
by a network side device, DCI to a terminal    301
FIG. 3

SCHEDULING MODE DETERMINATION METHOD, TERMINAL AND NETWORK SIDE DEVICE

CROSS-REFERENCE TO RELATED APPLICATIONS

This application is the U.S. national phase of PCT Application No. PCT/CN2021/086888 filed on Apr. 13, 2021, which claims a priority of the Chinese patent application No. 202010294638.6 filed on Apr. 15, 2020, the disclosures of which are incorporated herein by reference in their entireties.

TECHNICAL FIELD

The present disclosure relates to the field of communication technology, in particular to a scheduling mode determination method, a terminal, and a network side device.

BACKGROUND

For a network system, it schedules a terminal mainly through Downlink Control Information (DCI), so as to schedule the transmission of a channel or signal for a terminal. However, the communication system merely supports a scheduling mode where the transmission of one channel or one signal is scheduled through the DCI, so the DCI scheduling flexibility is relatively poor.

SUMMARY

An object of the present disclosure is to provide a scheduling mode determination method, a terminal and a network side device, so as to improve the DCI scheduling flexibility.

In one aspect, the present disclosure provides in some embodiments a scheduling mode determination method, including: receiving, by a terminal, DCI from a network side device; and determining, by the terminal, that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the N channels are N channels on a same carrier or different carriers, or the N signals are N signals on a same carrier or different carriers.

In some possible embodiments of the present disclosure, the determining, by the terminal, that the DCI corresponds to the first scheduling mode or the second scheduling mode includes determining, by the terminal, that the DCI corresponds to the first scheduling mode or the second scheduling mode in accordance with an explicit notification or an implicit rule.

In some possible embodiments of the present disclosure, the determining, by the terminal, that the DCI corresponds to the first scheduling mode or the second scheduling mode includes determining, by the terminal, that the DCI corresponds to the first scheduling mode or the second scheduling mode in accordance with target information about the DCI. The target information includes at least one of a DCI format, a Radio Network Temporary Identifier (RNTI), scheduling mode indication information, a target information field, a search space identifier, or a control resource set identifier.

In some possible embodiments of the present disclosure, when the DCI format of the DCI is a first DCI format, DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

In another aspect, the present disclosure provides in some embodiments a scheduling mode determination method, including transmitting, by a network side device, DCI to a terminal, and notifying the terminal that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the N channels are N channels on a same carrier or different carriers, or the N signals are N signals on a same carrier or different carriers.

In some possible embodiments of the present disclosure, the network side device notifies the terminal that the DCI corresponds to the first scheduling mode or the second scheduling mode through an explicit notification or an implicit rule.

In some possible embodiments of the present disclosure, the network side device notifies the terminal that the DCI corresponds to the first scheduling mode or the second scheduling mode through target information about the DCI, and the target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

In yet another aspect, the present disclosure provides in some embodiments a terminal, including: a reception module configured to receive DCI from a network side device; and a determination module configured to determine that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In still yet another aspect, the present disclosure provides in some embodiments a network side device, including a transmission module configured to transmit DCI to a terminal, and notify the terminal that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In still yet another aspect, the present disclosure provides in some embodiments a terminal, including a transceiver, a memory, a processor, and a program stored in the memory and executed by the processor. The transceiver is configured to receive DCI from a network side device, and the transceiver or the processor is configured to determine that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the determining, by the terminal, that the DCI corresponds to the first scheduling mode or the second scheduling mode includes determining, by the terminal, that the DCI corresponds to the first scheduling mode or the second scheduling mode in accordance with target information about the DCI. The target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In still yet another aspect, the present disclosure provides in some embodiments a network side device, including a transceiver, a memory, a processor, and a program stored in the memory and executed by the processor. The transceiver is configured to transmit DCI to a terminal, and notify the terminal that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the network side device notifies the terminal that the DCI corresponds to the first scheduling mode or the second scheduling mode through target information about the DCI, and the target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In still yet another aspect, the present disclosure provides in some embodiments a computer-readable storage medium storing therein a program. The program is executed by a processor so as to implement the steps in the scheduling mode determination method for the terminal, or the steps in the scheduling mode determination method for the network side device.

According to the embodiments of the present disclosure, the terminal receives the DCI from the network side device, and determines that the DCI corresponds to the first scheduling mode or the second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1. As a result, it is able to support two scheduling modes for the DCI, thereby to greatly improve the DCI scheduling flexibility.

BRIEF DESCRIPTION OF THE DRAWINGS

FIG. 1 is a schematic view showing an available network according to one embodiment of the present disclosure;

FIG. 2 is a flow chart of a scheduling mode determination method according to one embodiment of the present disclosure;

FIG. 3 is another flow chart of the scheduling mode determination method according to one embodiment of the present disclosure;

DETAILED DESCRIPTION

Figure 4:
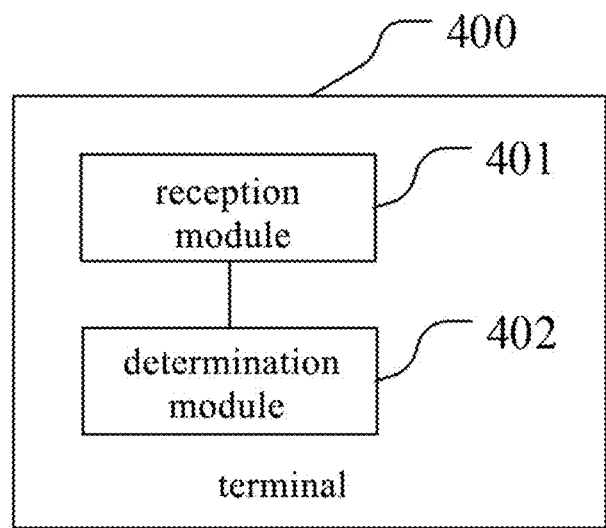
FIG. 4 is a schematic view showing a terminal according to one embodiment of the present disclosure.

In order to make the objects, the technical solutions and the advantages of the present disclosure more apparent, the present disclosure will be described hereinafter in a clear and complete manner in conjunction with the drawings and embodiments.

FIG. 1 shows an available network according to one embodiment of the present disclosure. As shown in FIG. 1, the network includes a terminal 11 and a network side device 12. The terminal 11 may be a User Equipment (UE) or any other terminal device, e.g., mobile phone, tablet personal computer, laptop computer, Personal Digital Assistant (PDA), Mobile Internet Device (MID), wearable device, robot or vehicle. It should be appreciated that, a specific type of the terminal will not be particularly defined herein. The network side device may be a base station (e.g., a macro base station, a Long Term Evolution (LTE) evolved Node B (eNB) or a 5G New Radio (NR) NB), a micro base station (e.g., a Low Power Node (LPN), a pico base station or a femto base station), an Access Point (AP), a Central Unit (CU), or a core network device (e.g., Mobility Management Entity (MME), Access Management Function (AMF), Session Management Function (SMF), User Plane Function (UPF), Serving Gateway (SGW), PDN gateway, Policy Control Function (PCF), Policy and Charging Rules Function (PCRF), or Serving GPRS Support Node (SGSN)). It should be appreciated that, a specific type of the network side device will not be particularly defined herein.

As shown in FIG. 2, the present disclosure provides in some embodiments a scheduling mode determination method, which includes: Step 201 of receiving, by a terminal, DCI from a network side device; and Step 202 of determining, by the terminal, that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

Specifically, the determining, by the terminal, the DCI corresponds to the first scheduling mode or the second scheduling mode includes determining that the DCI corresponds to the first scheduling mode or the second scheduling mode in accordance with a predefined rule or a notification content. To be specific, the terminal determines that the DCI is the first scheduling mode or the second scheduling mode.

Furthermore, the N channels are N channels on a same carrier, so as to schedule the transmission of a plurality of channels on a carrier through one piece of DCI. Alternatively, the N channels are channels on different carriers, so as to schedule the transmission of channels on a plurality of carriers through one piece of DCI. For example, the N channels are channels on N carriers respectively, so as to schedule the transmission of one channel on each carrier through the DCI. Of course, the transmission of one channel on one carrier, or the transmission of a plurality of channels on one or more carriers, is scheduled. In other words, the first scheduling mode is a single-carrier scheduling mode, and the second scheduling mode is a multi-carrier scheduling mode.

The N signals are N signals on a same carrier, so as to schedule the transmission of a plurality of signals on one carrier through one piece of DCI. Alternatively, the N signals are signals on different carriers, so as to schedule the transmission of signals on a plurality of carriers through one piece of DCI.

In addition, the transmission of N channels or N signals includes transmitting or receiving N channels or N signals.

In some embodiments of the present disclosure, through the above steps, it is able to support the two scheduling modes for the DCI, thereby to greatly improve the DCI scheduling flexibility. Further, the method further includes determining a content of the DCI scheduling in accordance with the determined scheduling mode, so as to perform the transmission in accordance with the content. The transmission includes transmitting or receiving the channels or signals.

In addition, in some embodiments of the present disclosure, the DCI in different scheduling modes includes different information field constitution mode or parsing mode. The terminal determines the scheduling mode for the DCI, and then correctly understands and parses information carried in the DCI in accordance with the determined scheduling mode.

In some possible embodiments of the present disclosure, the determining, by the terminal, that the DCI corresponds to the first scheduling mode or the second scheduling mode includes determining, by the terminal, that the DCI corresponds to the first scheduling mode or the second scheduling mode in accordance with an explicit notification or an implicit rule.

The explicit notification refers to that the network side device explicitly notifies the UE of the scheduling mode for the DCI through the DCI or any other message. The implicit rule refers to that the network side device notifies the UE of the scheduling mode for the DCI implicitly, so as to reduce a signaling overhead.

In some possible embodiments of the present disclosure, the determining, by the terminal, that the DCI corresponds to the first scheduling mode or the second scheduling mode includes determining, by the terminal, that the DCI corresponds to the first scheduling mode or the second scheduling mode in accordance with target information about the DCI. The target information includes at least one of a DCI format, an RNTI, scheduling mode indication information, a target information field, a search space identifier, or a control resource set (CORESET) identifier.

During the implementation, the scheduling mode for the DCI is determined in accordance with the format of the received DCI, e.g., the terminal determines that the current DCI is used to schedule data transmission on a single Component Carrier (CC) or a plurality of CCs.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode.

The first DCI format is a DCI format different from the second DCI format, e.g., a DCI format defined in a protocol, such a DCI format 0-0/0-1/0-2/1-0/1-1/1-2.

The second DCI format is a DCI format defined for the second scheduling mode, and it has at least one of the following features: the DCI includes DCI for scheduling uplink data and DCI for scheduling downlink data; the DCI is transmitted in a UE-specific search space (USS) and/or a common search space (CSS); or the second DCI format and a part of DCI formats are incapable of being configured simultaneously.

When the DCI includes the DCI for scheduling the uplink data and the DCI for scheduling the downlink data, the DCI in the second DCI format is DCI for scheduling the uplink data or the downlink data.

When the DCI is transmitted in the USS and/or the CSS, the DCI in the second DCI format is transmitted in the USS or the CSS.

The part of DCI formats includes certain special DCI formats, e.g., DCI format 0-2/1-2.

Taking a DCI format X for scheduling the data transmission on a plurality of CCs as the second DCI format, when the terminal determines that the received DCI is in the DCI format X, the terminal performs the data transmission on N number of CCs in accordance with scheduling information carried in the DCI. The DCI in the DCI format X includes DCI for scheduling uplink data and DCI for scheduling downlink data. A Cyclic Redundancy Check (CRC) of the DCI format X is scrambled with a Cell-Radio Network Temporary Identifier (C-RNTI), a Modulation and Coding Scheme-Cell-Radio Network Temporary Identifier (MCS-C-RNTI), a Configured Scheduling Radio Network Temporary Identifier (CS-RNTI), or a Semi-Persistent Channel State Information-Radio Network Temporary Identifier (SP-CSI-RNTI). The DCI in the DCI format X is transmitted in the USS and/or the CSS.

Further, the DCI format X is incapable of configured simultaneously with certain special DCI formats, e.g., DCI format 0-2/1-2.

In the embodiments of the present disclosure, the scheduling mode for the DCI is indicated through the DCI format, so as to reduce the signaling overhead.

In addition, in the embodiments of the present disclosure, the scheduling mode is also indicated through the RNTI.

In some possible embodiments of the present disclosure, when the DCI is scrambled with a first RNTI, the DCI corresponds to the first scheduling mode, and when the DCI is scrambled with a second RNTI, the DCI corresponds to the second scheduling mode.

The second RNTI is a new RNTI defined in some embodiments of the present disclosure for scrambling the CRC of the DCI for multi-carrier scheduling. For example, the second RNTI is a Dynamic Spectrum Sharing-Radio Network Temporary Identifier (DSS-RNTI). When the CRC of the DCI received by the terminal is scrambled with the DSS-RNTI, the terminal determines that the DCI is used for scheduling the data transmission on a plurality of CCs. In addition, in the embodiments of the present disclosure, when the scheduling mode for the DCI is the second scheduling mode, the DCI is in a currently-defined DCI format, e.g., DCI format 0-0/0-1/0-2/1-0/1-1/1-2. Alternatively, when the scheduling mode for the DCI is the second scheduling mode, the DCI is in a newly-introduced DCI format, e.g., the second DCI format.

Further, when the DCI in the second scheduling mode uses the DCI format defined in a protocol for the multi-carrier scheduling, the scheduling information indicated in each information field is determined in accordance with N sets of RRC parameters of the scheduled N channels or N signals.

In addition, in some embodiments of the present disclosure, the target information field is an information field newly added in the DCI. For example, a scheduling mode indication information field is added in the currently-defined DCI format, and it includes n bits. In addition, the scheduling mode indication information field is a first information field or a second information field in the DCI. In some possible embodiments of the present disclosure, when n=1, 0 indicates that the DCI corresponds to the first scheduling mode, e.g., it is used for single-carrier scheduling, and 1 indicates that the DCI corresponds to the second scheduling mode, e.g., it is used for multi-carrier scheduling.

In some possible embodiments of the present disclosure, the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode.

Specifically, the target information field is either time-domain resource assignment information or frequency-domain resource assignment information.

In the embodiments of the present disclosure, the scheduling mode for the DCI is determined in accordance with the resource assignment information indicated in the information field indicating the resource assignment, so as to reduce the signaling overhead. For example, when the target information field indicates the single-carrier scheduling, the terminal determines that the other information field is used for the single-carrier scheduling, and when the target information field indicates the multi-carrier scheduling, the terminal determines that the other information field is used for the multi-carrier scheduling.

Of course, in some embodiments of the present disclosure, the target information field is not limited to the information field indicating the resource assignment, and it may also be any existing information field in the DCI. To be specific, the current scheduling mode for the DCI is determined in accordance with statuses of some information fields in the received DCI, e.g., an association relationship between the statuses of the information fields and the scheduling modes for the DCI is configured in advance. For example, the scheduling mode for the DCI is determined in accordance with a status of a Carrier Indicator Field (CIF).

Further, for the target information field, the DCI is in a currently-defined DCI format and scrambled with any currently-defined RNTI.

In addition, in the embodiments of the present disclosure, the scheduling mode for the DCI is also determined in accordance with a search space identifier or a control resource set identifier.

In some possible embodiments of the present disclosure, when the search space identifier of the DCI is a first search space identifier, the DCI corresponds to the first scheduling mode, and when the search space identifier of the DCI is a second search space identifier, the DCI corresponds to the second scheduling mode.

In some possible embodiments of the present disclosure, when the control resource set identifier of the DCI is a first control resource set identifier, the DCI corresponds to the first scheduling mode, and when the control resource set identifier of the DCI is a second control resource set identifier, the DCI corresponds to the second scheduling mode.

The first search space identifier, the second search space identifier, the first control resource set identifier and the second control resource set identifier are configured through high-layer signaling or pre-defined in a protocol.

In some possible embodiments of the present disclosure, in the case that the DCI corresponds to the second scheduling mode, the quantity of channels or signals actually scheduled through the DCI is one or plural.

In the embodiments of the present disclosure, when the quantity of channels or signals actually scheduled through the DCI in the second scheduling mode is one or plural, it is able to further improve the DIC scheduling flexibility. For example, when the scheduling mode for the DCI is multi-carrier scheduling, the DCI is used to schedule the data transmission on a single carrier or a plurality of carriers.

According to the embodiments of the present disclosure, the terminal receives the DCI from the network side device, and determines that the DCI corresponds to the first scheduling mode or the second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1. As a result, it is able to support two scheduling modes for the DCI, thereby to greatly improve the DCI scheduling flexibility.

As shown in FIG. 3, the present disclosure further provides in some embodiments another scheduling mode determination method, which includes Step 301 of transmitting, by a network side device, DCI to a terminal, and notifying the terminal that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the N channels are N channels on a same carrier or different carriers, or the N signals are N signals on a same carrier or different carriers.

In some possible embodiments of the present disclosure, the network side device notifies the terminal that the DCI corresponds to the first scheduling mode or the second scheduling mode through an explicit notification or an implicit rule.

In some possible embodiments of the present disclosure, the network side device notifies the terminal that the DCI corresponds to the first scheduling mode or the second scheduling mode through target information about the DCI, and the target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

It should be appreciated that, the method in this embodiment of the present disclosure is implemented by the network side device, and the implementation thereof may refer to relevant description in the above-mentioned method for the terminal in FIG. 2, which will not be particularly defined herein.

The scheduling mode determination method will be illustratively described hereinafter when the second scheduling mode is a multi-carrier scheduling mode.

First Embodiment

In this embodiment, it is presumed that the terminal supports the scheduling of the data transmission on a plurality of CCs through one piece of DCI. At a base station side, a newly-introduced DCI format is used for scheduling the data transmission on the plurality of CCs. For example, DCI format 0-3 is used to schedule the transmission of uplink data on the plurality of CCs, and DCI format 1-3 is used to schedule the transmission of downlink data on the plurality of CCs. The DCI format 0-3/1-3 and the other type of DCI format may be configured to be transmitted within a same search space.

After the terminal has detected the DCI within a search space on a Physical Downlink Control Channel (PDCCH) monitoring occasion, it at first determines the DCI format. When the DCI is in the DCI format 0-3/1-3, the terminal performs the data transmission on N number of CCs in accordance with scheduling information carried in the DCI. When the DCI is in the other DCI format, the terminal performs the data transmission on a corresponding scheduled carrier in accordance with the scheduling information carried in the DCI. A CRC of the DCI format 0-3/1-3 is scrambled with any of a C-RNTI, an MCS-C-RNTI, a CS-RNTI and an SP-CSI-RNTI, and a payload size thereof is different from that of the other type of DCI format.

The newly-introduced DCI format is configured to be transmitted in the CSS and/or USS, which will not be particularly defined herein.

Further, the DCI format 0-3/1-3 is incapable of being configured simultaneously with some special DCI formats, e.g., DCI format 0-2/1-2.

Second Embodiment

In this embodiment, it is presumed that the terminal supports the scheduling of the data transmission on a plurality of CCs through one piece of DCI. A new RNTI, e.g., DSS-RNTI, is defined for scrambling a CRC of the DCI for scheduling the data transmission on the plurality of CCs.

After the terminal has detected the DCI within a search spacer on a PDCCH monitoring occasion, the terminal descrambles the DCI through different RNTIs. When the DCI is descrambled successfully through the DSS-RNTI, the terminal performs the data transmission on N number of CCs in accordance with the scheduling information carried in the DCI, and when the DCI is descrambled successfully through the other RNTI, the terminal performs the data transmission on a corresponding scheduled carrier in accordance with the scheduling information carried in the DCI. The DCI is in any of existing DCI formats 0-0/0-1/0-2/1-0/1-1/1-2, or a newly-introduced DCI format for scheduling the data transmission on a plurality of carriers, e.g., DCI format 0-3/1-3.

When the existing DCI format is used for the multi-carrier scheduling, the scheduling information indicated in each information field is determined in accordance with N sets of RRC parameter configurations of N scheduled carriers. For example, for a specific bit field, the data transmission on CC#1 is determined in accordance with a configuration parameter on CC#1 and scheduling information in the bit field, and the data transmission on CC#2 is determined in accordance with a configuration parameter on CC#2 and the scheduling information in the bit field.

Third Embodiment

In this embodiment, it is presumed that the terminal supports the scheduling of the data transmission on a plurality of CCs through one piece of DCI. A multi-carrier scheduling indication field, e.g., DSS indication, is introduced in the existing DCI, so as to indicate whether the DCI is used to schedule the data transmission on a single CC or a plurality of CCs. It is presumed that the information field includes 1-bit information.

After the terminal has detected the DCI within a search space on a PDCCH monitoring occasion, the terminal determines that the DCI is used to schedule the data transmission on a plurality of CCs or a single CC in accordance with the multi-carrier scheduling indication field (DSS indication) carried in the DCI. When the multi-carrier scheduling indication field is 1, the terminal performs the data transmission on N number of CCs in accordance with the scheduling information carried in the DCI. When the multi-carrier scheduling indication field is 0, the terminal performs the data transmission on a corresponding scheduled carried in accordance with the scheduling information carried in the DCI. The DCI is in any of the existing DCI formats 0-0/0-1/0-2/1-0/1-1/1-2.

Further, the indication information included in the indication field has more than one bit, e.g., two bits, so as to indicate the quantity of carriers in a carrier group scheduled by the DCI and/or carrier indices. Table 1 shows a simple example.

TABLE 1

| The quantity of CCs scheduled by DCI | | Carrier group |
|---|---|---|
| 00 | 1 | |
| 01 | 2 | {scheduled carrier CC#0, other carrier CC#1} |
| 10 | 2 | {scheduled carrier CC#0, other carrier |

TABLE 1-continued

| The quantity of CCs scheduled by DCI | | Carrier group |
|---|---|---|
| | | CC#3} |
| 11 | 3 | {scheduled carrier CC#0, other carrier CC#1, other carrier CC#2} |

It should be appreciated that, Table 1 is merely for illustrative purposes only, and in the embodiments of the present disclosure, the carrier group will not be particularly defined.

Fourth Embodiment

In this embodiment, it is presumed that the terminal supports the scheduling of the data transmission on a plurality of CCs through one piece of DCI. The terminal determines whether the DCI is used for scheduling the data transmission on N number of CCs or a specific CC in accordance with statuses of some indication fields in the DCI. When the terminal determines that the DCI is used for scheduling the data transmission on the N number of CCs, the terminal parses the other information field in a multi-carrier scheduling manner. When one piece of DCI is used to schedule the data transmission on two CCs, information indicated by each information field on CC#1 is determined in accordance with a relevant configuration of CC#1, and information indicated by each information field on CC#2 is determined in accordance with a relevant configuration of CC#2. When the terminal determines that the DCI is used for scheduling the data transmission on a single CC, the terminal parses the other information field in a single-carrier scheduling manner, i.e., the information indicated by the other information field is determined in accordance with a configuration parameter of the scheduled carrier.

For example, the terminal determines whether the DCI is used to schedule the data transmission on a single carrier or N carriers in accordance with an information status in a Time Domain Resource Assignment (TDRA) field. Each row in a TDRA table includes time-domain resources for transmitting data on one or N carriers. It is presumed that N=2, and a bit length of the TDRA field is 4 bits. Table 2 shows a simple example.

TABLE 2

| TDRA entry index | TDRA for CC#1 | TDRA for CC#2 |
|---|---|---|
| 0 | Information#1-1 | Null |
| 1 | Information#2-1 | Null |
| 2 | Information#3-1 | Null |
| 3 | Information#4-1 | Null |
| 4 | Information#5-1 | Information#5-2 |
| 5 | Information#6-1 | Information#6-2 |
| 6 | Information#7-1 | Information#7-2 |
| . . . | . . . | . . . |

In this way, when a TDRA entry index indicated by the TDRA field in the DCI is any of 0 to 3, it means that the DCI is merely used for scheduling the data transmission on CC#1, and a bit length of the other information field and the scheduling information indicated thereby is determined in accordance a configuration parameter of the CC. When the TDRA entry index indicated by the TDRA field in the DCI is greater than or equal to 4, it means that the DCI is used for scheduling the data transmission on both CC#1 and CC#2.

For another example, the terminal determines whether the DCI is used to schedule the data transmission on a single carrier or N carriers in accordance with an information status carried in a CIF. When the information status carried in the CIF indicates a single carrier or a scheduled carried, the scheduling mode for the DCI is a single-carrier scheduling mode.

Fifth Embodiment

In this embodiment, it is presumed that the terminal supports the scheduling of the data transmission on a plurality of CCs through one piece of DCI. A base station configures, through RRC signaling, a search space ID or a CORESET ID for transmitting the DCI for multi-carrier scheduling, or determines a search space ID or a CORESET ID predefined in a protocol for transmitting the DCI for multi-carrier scheduling.

After the terminal has received the DCI within the search space or CORESET, the terminal determines that the DCI is used for scheduling the data transmission on N carriers.

Further, when a PDCCH candidate within the search spacer for transmitting the DCI for multi-carrier scheduling coincides with a PDCCH candidate within the other search space, the terminal may consider that the PDCCH candidate is used to transmit the DCI for multi-carrier scheduling, i.e., the scheduling mode for the DCI is indicated in this way.

It should be appreciated that, when the DCI corresponds to the multi-carrier scheduling mode, in some embodiments of the present disclosure, the composition of each information field in the DCI is determined in accordance with the multi-carrier scheduling mode. At this time, depending on a specific DCI design, the DCI is still used for scheduling the data transmission on a single carrier, which will not be particularly defined herein.

In some embodiments of the present disclosure, the base station indicates, explicitly or implicitly, that the DCI transmitted to the terminal is used for scheduling the data transmission on a single CC or a plurality of CCs, and the terminal determines, explicitly or implicitly, that the received DCI is used for scheduling the data transmission on a single CC or a plurality of CCs.

According to the embodiments of the present disclosure, it is able to improve the flexibility of a system, and prevent the occurrence of a scheduling constraint when the multi-carrier scheduling mode is always adopted.

As shown in FIG. 4, the present disclosure provides in some embodiments a terminal 400, which includes: a reception module 401 configured to receive DCI from a network side device; and a determination module 402 configured to determine that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the N channels are N channels on a same carrier or different carriers, or the N signals are N signals on a same carrier or different carriers.

In some possible embodiments of the present disclosure, the determination module is further configured to determine that the DCI corresponds to the first scheduling mode or the second scheduling mode in accordance with an explicit notification or an implicit rule.

In some possible embodiments of the present disclosure, the determination module is further configured to determine that the DCI corresponds to the first scheduling mode or the second scheduling mode in accordance with target information about the DCI. The target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

It should be appreciated that, the terminal 400 may be a terminal in the above-mentioned method embodiments, and it may be used to implement the above-mentioned method with a same beneficial effect, which will not be particularly defined herein.

Figure 5:
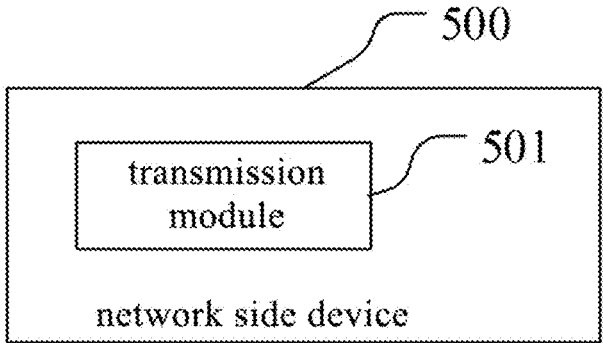
FIG. 5 is a schematic view showing a network side device according to one embodiment of the present disclosure.

As shown in FIG. 5, the present disclosure provides in some embodiments a network side device 500, which includes a transmission module 501 configured to transmit DCI to a terminal, and notify the terminal that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1.

In some possible embodiments of the present disclosure, the N channels are N channels on a same carrier or different carriers, or the N signals are N signals on a same carrier or different carriers.

In some possible embodiments of the present disclosure, the network side device notifies the terminal that the DCI corresponds to the first scheduling mode or the second scheduling mode through an explicit notification or an implicit rule.

In some possible embodiments of the present disclosure, the network side device notifies the terminal that the DCI corresponds to the first scheduling mode or the second scheduling mode through target information about the DCI, and the target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

It should be appreciated that, the network side device 500 may be a network side device in the above-mentioned method embodiments, and it may be used to implement the above-mentioned method with a same beneficial effect, which will not be particularly defined herein.

Figure 6:
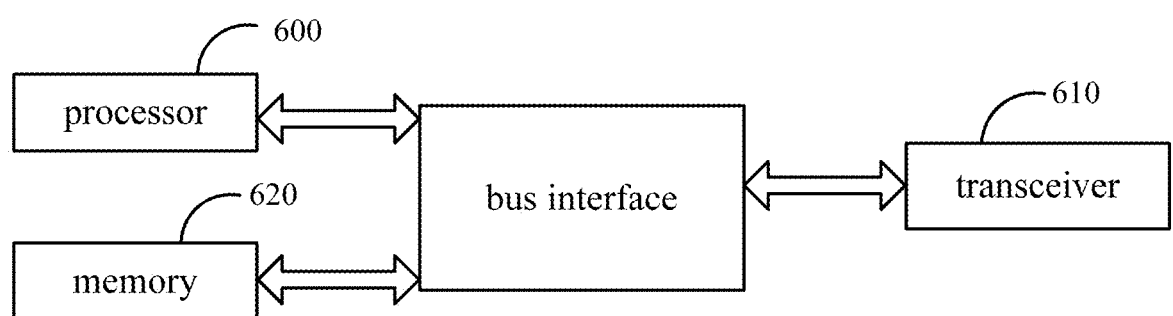
FIG. 6 is another schematic view showing the terminal according to one embodiment of the present disclosure.

As shown in FIG. 6, the present disclosure provides in some embodiments a terminal, which includes a transceiver 610, a memory 620, a processor 600, and a program stored in the memory 620 and executed by the processor 600. The transceiver 610 is configured to receive DCI from a network side device, and the transceiver 610 or the processor 600 is configured to determine that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1. The transceiver 610 is configured to receive and transmit data under the control of the processor 600.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. A bus interface may be provided, and the transceiver 610 may consist of a plurality of elements, i.e., a transmitter and a receiver for communication with any other devices over a transmission medium.

The processor 600 may take charge of managing the bus architecture as well as general processings. The memory 620 may store therein data for the operation of the processor 600.

It should be appreciated that, the memory 620 is not limited to be located on the terminal, and instead, it may also be located at a geographical position different from the processor 600.

In some possible embodiments of the present disclosure, the N channels are N channels on a same carrier or different carriers, or the N signals are N signals on a same carrier or different carriers.

In some possible embodiments of the present disclosure, the transceiver or processor is further configured to determine that the DCI corresponds to the first scheduling mode or the second scheduling mode in accordance with an explicit notification or an implicit rule.

In some possible embodiments of the present disclosure, the transceiver or processor is further configured to determine that the DCI corresponds to the first scheduling mode or the second scheduling mode in accordance with target information about the DCI. The target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

It should be appreciated that, the terminal may be a terminal in the above-mentioned method embodiments, and it may be used to implement the above-mentioned method with a same beneficial effect, which will not be particularly defined herein.

Figure 7:
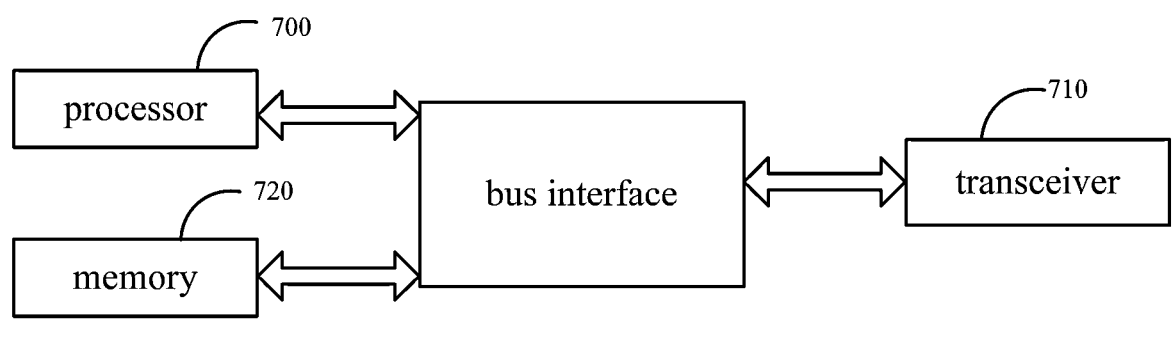
FIG. 7 is another schematic view showing the network side device according to one embodiment of the present disclosure.

As sown in FIG. 7, the present disclosure further provides in some embodiments a network side device, which includes a transceiver 710, a memory 720, a processor 700, and a program stored in the memory 720 and executed by the processor. The transceiver is configured to transmit DCI to a terminal, and notify the terminal that the DCI corresponds to a first scheduling mode or a second scheduling mode. The first scheduling mode is a mode in which the transmission of one channel or one signal is scheduled, the second scheduling mode is a mode in which the transmission of N channels or N signals is scheduled, the channel includes an uplink channel or a downlink channel, and the signal incudes an uplink signal or a downlink signal, where N is an integer greater than 1. The transceiver 710 is configured to receive and transmit data under the control of the processor 700.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. A bus interface may be provided, and the transceiver 710 may consist of a plurality of elements, i.e., a transmitter and a receiver for communication with any other devices over a transmission medium.

The processor 700 may take charge of managing the bus architecture as well as general processings. The memory 720 may store therein data for the operation of the processor 700.

It should be appreciated that, the memory 720 is not limited to be located on the network side device, and instead, it may be located at a geographical position different from the processor 700.

In some possible embodiments of the present disclosure, the N channels are N channels on a same carrier or different carriers, or the N signals are N signals on a same carrier or different carriers.

In some possible embodiments of the present disclosure, the network side device notifies the terminal that the DCI corresponds to the first scheduling mode or the second scheduling mode through an explicit notification or an implicit rule.

In some possible embodiments of the present disclosure, the network side device notifies the terminal that the DCI corresponds to the first scheduling mode or the second scheduling mode through target information about the DCI, and the target information includes at least one of a DCI format, an RNTI, scheduling mode indication information, a target information field, a search space identifier, or a control resource set identifier.

In some possible embodiments of the present disclosure, when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

In some possible embodiments of the present disclosure, the second DCI format is a DCI format defined for the second scheduling mode, and the second DCI format has at least one of the following features: the DCI includes DCI for scheduling uplink data and DCI for scheduling downlink data; the DCI is transmitted in a UE-specific search space and/or a common search space; or the second DCI format and a part of DCI formats are incapable of being configured simultaneously.

In some possible embodiments of the present disclosure, in the case that the DCI corresponds to the second scheduling mode, the quantity of channels or signals actually scheduled through the DCI is one or plural.

It should be appreciated that, the network side device may be a network side device in the above-mentioned method embodiments, and it may be used to implement the above-mentioned method with a same beneficial effect, which will not be particularly defined herein.

The present disclosure further provides in some embodiments a computer-readable storage medium storing therein a program. The program is executed by a processor, so as to implement the steps in the scheduling mode determination method for the terminal, or the steps in the scheduling mode determination method for the network side device.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing module, or the functional units may exist independently, or two or more functional units may be combined together. The functional units may be implemented in the form of hardware or software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A scheduling mode determination method, comprising:
receiving, by a terminal, Downlink Control Information (DCI) from a network side device; and
determining, by the terminal, a corresponding scheduling mode that corresponds to the DCI, wherein the corresponding scheduling mode comprises a first scheduling mode or a second scheduling mode,
wherein the first scheduling mode is a mode in which scheduling of the transmission of one channel or one signal is supported, the second scheduling mode is a mode in which scheduling of the transmission of N channels or N signals is supported, the channel comprises an uplink channel or a downlink channel, and the signal includes an uplink signal or a downlink signal, where N is an integer greater than 1;
wherein the N channels are N channels on a same carrier or different carriers, or the N signals are N signals on a same carrier or different carriers; and
wherein in the case that the DCI corresponds to the second scheduling mode, the quantity of channels or signals actually scheduled through the DCI is one.

2. The scheduling mode determination method according to claim 1, wherein
when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

3. The scheduling mode determination method according to claim 2, wherein the second DCI format is a DCI format defined for the second scheduling mode, and the second DCI format has at least one of the following features: the DCI comprises DCI for scheduling uplink data and DCI for scheduling downlink data; the DCI is transmitted in a User Equipment (UE)-specific search space and/or a common search space; or the second DCI format and a part of DCI formats are incapable of being configured simultaneously.

4. The scheduling mode determination method according to claim 1, wherein the determining, by the terminal, that the DCI corresponds to the first scheduling mode or the second scheduling mode comprises:

determining, by the terminal, that the DCI corresponds to the first scheduling mode or the second scheduling mode in accordance with target information about the DCI, wherein the target information comprises at least one of a DCI format, a Radio Network Temporary Identifier (RNTI), scheduling mode indication information, a target information field, a search space identifier, or a control resource set identifier.

5. A scheduling mode determination method, comprising:

transmitting, by a network side device, DCI to a terminal, and notifying the terminal to determine a corresponding scheduling mode that corresponds to the DCI, wherein the corresponding scheduling mode comprises a first scheduling mode or a second scheduling mode, wherein the first scheduling mode is a mode in which scheduling of the transmission of one channel or one signal is supported, the second scheduling mode is a mode in which scheduling of the transmission of N channels or N signals is supported, the channel comprises an uplink channel or a downlink channel, and the signal includes an uplink signal or a downlink signal, where N is an integer greater than 1;

wherein the N channels are N channels on a same carrier or different carriers, or the N signals are N signals on a same carrier or different carriers; and wherein in the case that the DCI corresponds to the second scheduling mode, the quantity of channels or signals actually scheduled through the DCI is one.

6. The scheduling mode determination method according to claim 5, wherein when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

7. The scheduling mode determination method according to claim 6, wherein the second DCI format is a DCI format defined for the second scheduling mode, and the second DCI format has at least one of the following features: the DCI comprises DCI for scheduling uplink data and DCI for scheduling downlink data; the DCI is transmitted in a UE-specific search space and/or a common search space; or the second DCI format and a part of DCI formats are incapable of being configured simultaneously.

8. A network side device, comprising a transceiver, a memory, a processor, and a program stored in the memory and executed by the processor, when the program stored in the memory is called and executed by the processor, the scheduling mode determination method according to claim 5 is realized.

9. The network side device according to claim 8, wherein when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

10. The network side device according to claim 9, wherein the second DCI format is a DCI format defined for the second scheduling mode, and the second DCI format has at least one of the following features: the DCI comprises DCI for scheduling uplink data and DCI for scheduling downlink data; the DCI is transmitted in a UE-specific search space and/or a common search space; or the second DCI format and a part of DCI formats are incapable of being configured simultaneously.

11. The network side device according to claim 8, wherein the network side device notifies the terminal that the DCI corresponds to the first scheduling mode or the second scheduling mode through target information about the DCI, and the target information comprises at least one of a DCI format, an RNTI, scheduling mode indication information, a target information field, a search space identifier, or a control resource set identifier.

12. The scheduling mode determination method according to claim 5, wherein the network side device notifies the terminal that the DCI corresponds to the first scheduling mode or the second scheduling mode through target information about the DCI, and the target information comprises at least one of a DCI format, an RNTI, scheduling mode indication information, a target information field, a search space identifier, or a control resource set identifier.

13. A terminal, comprising a transceiver, a memory, a processor, and a program stored in the memory and executed by the processor, wherein the transceiver is configured to receive DCI from a network side device, and the transceiver or the processor is configured to determine a corresponding scheduling mode that corresponds to the DCI, wherein the corresponding scheduling mode comprises a first scheduling mode or a second scheduling mode, wherein the first scheduling mode is a mode in which scheduling of the transmission of one channel or one signal is supported, the second scheduling mode is a mode in which scheduling of the transmission of N channels or N signals is supported, the channel comprises an uplink channel or a downlink channel, and the signal includes an uplink signal or a downlink signal, where N is an integer greater than 1;

wherein the N channels are N channels on a same carrier or different carriers, or the N signals are N signals on a same carrier or different carriers; and wherein in the case that the DCI corresponds to the second scheduling mode, the quantity of channels or signals actually scheduled through the DCI is one.

14. The terminal according to claim 13, wherein when the DCI format of the DCI is a first DCI format, the DCI corresponds to the first scheduling mode, and when the DCI format of the DCI is a second DCI format, the DCI corresponds to the second scheduling mode; or when the DCI is scrambled with a first RNTI, the DCI corresponds to the first scheduling mode, and when the DCI is scrambled with a second RNTI, the DCI corresponds to the second scheduling mode; or the target information field is an information field indicating resource assignment, when the target information field indicates resource assignment information about the N channels or the N signals, the DCI corresponds to the second scheduling mode, and when the target information field indicates resource assignment information about the one channel or the one signal, the DCI corresponds to the first scheduling mode; or when the search space identifier of the DCI is a first search space identifier, the DCI corresponds to the first scheduling mode, and when the search space identifier of the DCI is a second search space identifier, the DCI corresponds to the second scheduling mode; or when the control resource set identifier of the DCI is a first control resource set identifier, the DCI corresponds to the first scheduling mode, and when the control resource set identifier of the DCI is a second control resource set identifier, the DCI corresponds to the second scheduling mode.

15. The terminal according to claim 14, wherein the second DCI format is a DCI format defined for the second scheduling mode, and the second DCI format has at least one of the following features: the DCI comprises DCI for scheduling uplink data and DCI for scheduling downlink data; the DCI is transmitted in a User Equipment (UE)-specific search space and/or a common search space; or the second DCI format and a part of DCI formats are incapable of being configured simultaneously.

16. The terminal according to claim 13, wherein the processor is further configured to:

determine that the DCI corresponds to the first scheduling mode or the second scheduling mode in accordance with target information about the DCI, wherein the target information comprises at least one of a DCI format, a Radio Network Temporary Identifier (RNTI), scheduling mode indication information, a target information field, a search space identifier, or a control resource set identifier.

* * * * *